UNITED STATES PATENT OFFICE.

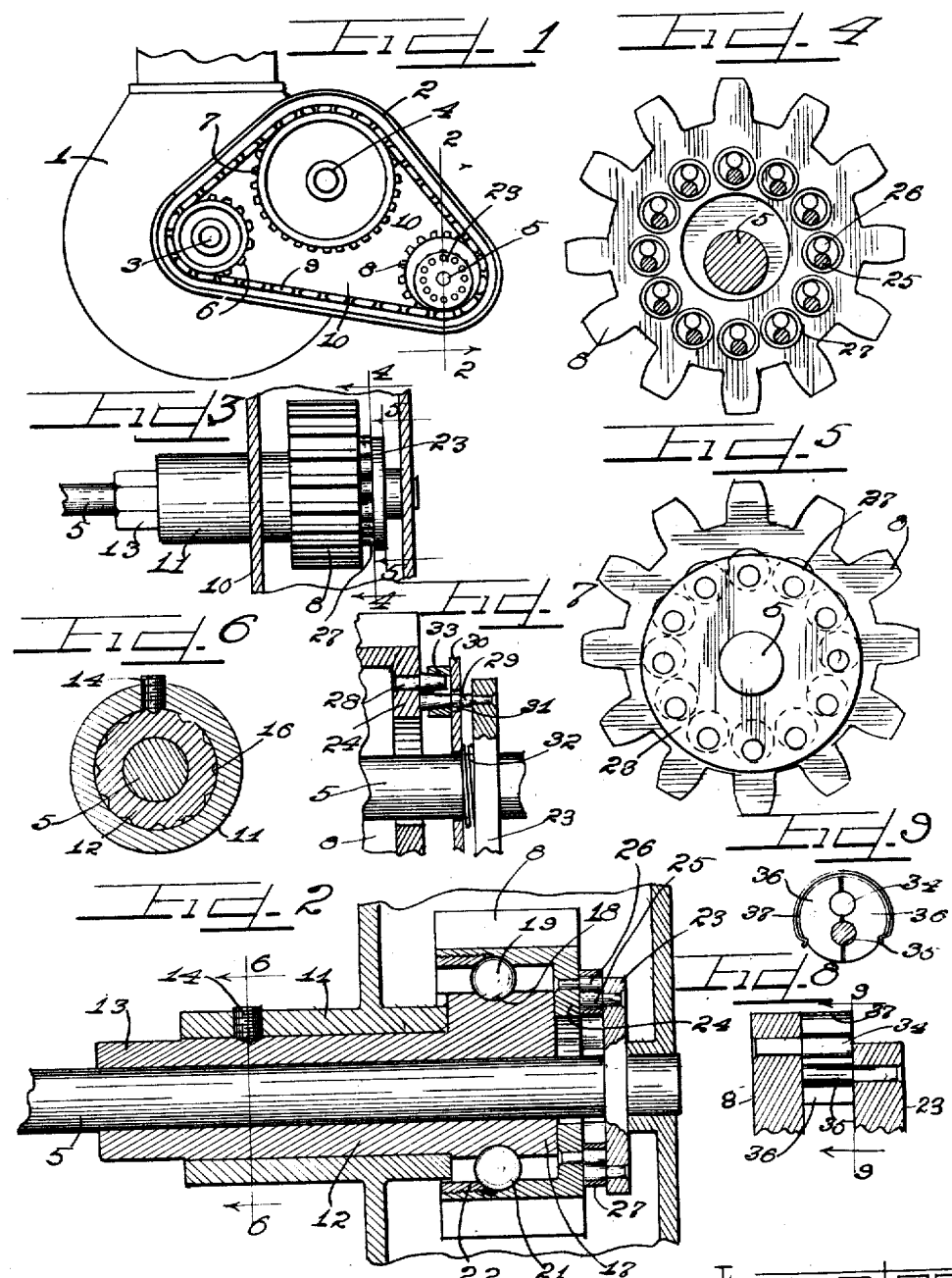

CHARLES L. RAYFIELD, OF CHICAGO, ILLINOIS.

BELT-TIGHTENER.

1,345,461.  Specification of Letters Patent.  Patented July 6, 1920.

Application filed March 19, 1918. Serial No. 223,258.

*To all whom it may concern:*

Be it known that I, CHARLES L. RAYFIELD, a citizen of the United States, and a resident of the city of Chicago, in the county of Cook and State of Illinois, have invented certain new and useful Improvements in Belt-Tighteners; and I do hereby declare that the following is a full, clear, and exact description of the same, reference being had to the accompanying drawings, and to the numerals of reference marked thereon, which form a part of this specification.

This invention relates to devices in which there are belted or similarly connected rotary members, and has for its primary object to provide means whereby said members may be adjusted relatively to one another without changing the relative positions of the parts with which they are operatively connected.

The invention also embodies certain minor details of construction, as hereinafter more definitely will be pointed out and claimed, reference being had to the accompanying drawing, in which:

Figure 1 is an end view of an engine and gear case having the gear case cover removed and having my invention applied thereto.

Fig. 2 is an enlarged sectional view on the line 2—2 of Fig. 1.

Fig. 3 is a view in elevation and somewhat reduced of the parts shown in Fig. 2.

Fig. 4 is an enlarged view on the line 4—4 of Fig. 3.

Fig. 5 is an enlarged view on the line 5—5 of Fig. 3.

Fig. 6 is a sectional view on the line 6—6 of Fig. 2.

Fig. 7 is a fragmentary view showing a modified form of connector for the driving and driven parts of my chain tightener.

Fig. 8 is a fragmentary view of another form of connector.

Fig. 9 is a view on the line 9—9 of Fig. 8.

As shown on the drawings:

The reference numeral 1, indicates a crank case of an engine which may be of any type, 2, a gear case which is at one end of the crank case; 3 the crank shaft of the engine, 4, the cam shaft which is usually provided for operating the valves of the engine, and 5, the shaft which is usually provided for operating the pump, magneto, generator and other mechanism. Said shafts 3, 4 and 5, are provided with the gear wheels 6, 7 and 8, respectively which are connected by means of the link belt 9, so as to be operated from the crank shaft 3. The inner wall 10, of the gear case, is provided with a bearing 11, which has a sleeve 12, mounted to rotate therein, and this sleeve in turn forms a bearing to support the shaft 5. The sleeve 12, is formed at one end of the bearing 11, into a nut 13, which may be engaged by a wrench for adjusting the sleeve 12, circularly, and there is a set screw 14, threaded through the wall of the bearing 11, so as to engage one of a plurality of notches 16, in the face of the sleeve 12, for holding the sleeve 12, in any of its positions of adjustment. At the opposite end of the bearing 11, the sleeve 12, is provided with a disk or bearing 17, which is arranged eccentrically around the shaft 5, and has the gear 8, mounted to turn thereon, likewise eccentrically around the shaft 5. The gear 8, may be mounted directly upon the bearing or disk 17, but is preferably mounted thereon by means of ball bearings 19, which engage in a ball race 18, on the outer face of the disk or bearing 17, and engage a corresponding ball race on the interior of the gear 8. The ball race on the interior of the gear 8, is partially formed on the gear as at 21, and partially on the inner end of a threaded insert 22, so that the parts may be assembled and the gear 8, held securely on the bearing 17.

From the foregoing, it will be noted that the gear 8, is mounted so as to rotate eccentrically around the shaft 5, and also that the sleeve 12, is circularly adjustable so that the position of the gear 8, with respect to the shaft 5, may be varied.

For the purpose of connecting the shaft 5, with the gear 8, so that the said shaft may be operated from the gear in its eccentric relation in any position of adjustment, the shaft 5, is provided with a disk or plate 23, spaced from the gear 8, which disk or plate may be secured on the shaft or formed integrally therewith, and the gear 8, has an inwardly extending flange 24, as shown. The disk or plate 23, has a plurality of pins 25, which project inwardly to the flange 24, and the flange 24, has corresponding pins 26, which extend outwardly to the plate 23, the said pins 25 and 26, being arranged in pairs and positioned and proportioned so that the said pins bear snugly one against the other. Each pair of pins 25 and 26, is housed in a ring bearing 27, which holds the pins snugly one against the other, and permits the pins 26, to revolve about the pins 25, as the gear 8, is turned about the bearing 17. The bands or rings 27, which connect the pins 25 and 26, compel the disk 23, to turn with the gear 8, and on account of the eccentrical relation of the gear 8, and the shaft 5, the pins 25, in their rotation about the bearing 17, constantly approach or retreat from the axis of the shaft 5, so that at one point in the revolution, a pin 26, is at the outer side of the pin 25, and as the gear 8, is turned, the pin 26, gradually approaches the axis of the shaft 5, and moves around the pin 25, until at the end of the half revolution the pin 26, is at the inner side of the pin 25, and the following half revolution moves the pin 26, farther around the pin 25, until at the end of the complete revolution, it is again at a point at the outer side of the pin 25.

With the pins and rings arranged as shown in Fig. 4, some of the pins 26, are bearing against their companion pins 25, to cause movement of the shaft 5, and some of the pins 26, are bearing against the inner face of the ring and exerting a pull on the companion pins 25, to cause movement of the shaft 5. With this construction there is a uniform distribution of power from the gear 8, around the disk 23, which tends to turn the shaft 5, and the shaft 5, is caused to move evenly and uniformly with the movement of the gear 8.

Referring to Fig. 7, in which is shown a modified form of connector for the gear 8, and the plate 23, the gear 8, is provided with pins 28, extending outwardly toward the plate 23, and tapered to a smaller diameter at their outer ends than adjacent the gear 8. Each pin 29, which projects inwardly from the disk 23, is expanded from a point adjacent the disk 23, to a larger diameter at the outer end thereof next to the gear 8, so that the pins 28 and 29, have similarly arranged conical portions which bear together around their bases and both taper from the gear 8 to a smaller diameter, as shown in Fig. 7. The plate 23, is spaced from the gear 8, sufficiently so that the plate 30, may be interposed between the plate 23, and the gear 8, and the plate 30 is provided with perforations 31, through which the pins 29, extend. Interposed between the plate 30, and the disk 23, is a coiled spring 32, which constantly forces the plate 30, inwardly toward the gear 8, and on the inner face of the plate 30, surrounding each pair of pins 28 and 29, is a ring 33, which engages the tapered pins 28 and 29, so as to hold them in full contact and take up any wear or looseness. The rings 33, which preferably have their inner faces tapered to fit the taper of the pins 28 and 29, are loose from the plate 30, and as the gear 8, and plate 23, revolve are swung about the pins 29, as the pins 28, rotate around the pins 29, and are at all times held in close contact with both pins, and both pins are accordingly held in close relation by reason of the tension exerted by the spring 32, against the plate 30.

In Figs. 8 and 9, which illustrate another modification of this invention the pins 34, on the gear 8, and the pins 35, on the plate 23, are similar to the pins 25 and 26, of the Figs. 3, 4 and 5, previously described, but are separated from contact with one another and are pivotally connected by means of the half bearings 36, which embrace the two pins 34 and 35, and are held together by means of the spring 37. These half bearings 36 are spaced slightly and held apart by the engagement of the pins 34 and 35, therewith, this construction being provided so that the springs 37, will cause the bearings 36, to exert a constant pressure on the pins 34 and 35, to prevent looseness and take up any wear.

It is thought that the operation of the device will be clearly understood from the foregoing description and without any further explanation, and it is also to be understood that while I have illustrated my invention in connection with certain shafts of an engine, I contemplate using the invention in any case where a belt tightener is required or wherein a change is required in the spacing of driving and the driven members without changing the relation or spacing of the shafts which they operate.

I am aware that the details of construction may be varied through a wide range without departing from the principles of this invention. I therefore do not purpose limiting the patent granted otherwise than necessitated by the prior art.

I claim as my invention:

1. The combination of a rotary shaft, a normally fixed eccentric adjustable circularly thereon, a rotary member mounted on said eccentric, a disk secured to said shaft and rotatable therewith, and means disposed between said rotary member and disk for imparting motion from one of said parts to the other in any position of adjustment of said eccentric.

2. The combination of a rotary member, a second member rotatable eccentrically about the first member, and spring pressed means connecting the said members for operating one of the members concurrently from the other of said members.

3. The combination of a rotary member, a second member rotatable eccentrically about the first mentioned member, connectors on the said members, and spring pressed means engaging the connectors for operating one of the members concurrently from the other member.

4. The combination of a rotary member, a bearing extending eccentrically around the said rotary member, a member mounted on the said eccentric bearing so as to rotate eccentrically around the first mentioned rotary member, and resilient means connecting the said members so as to operate one of the said members concurrently from the other member.

5. The combination of a rotary shaft, a normally fixed eccentric adjustable circularly thereon, a rotary member mounted on the eccentric, a disk secured to the shaft and rotatable therewith, a series of laterally extending conical pins on said member, a second corresponding series of conical pins laterally extending from said disk, a series of rings having conical inner faces surrounding pairs of pins of each of the two series, and spring means for holding said rings in contact with said pins.

In testimony whereof I have hereunto subscribed my name in the presence of two subscribing witnesses.

CHARLES L. RAYFIELD.

Witnesses:
CHARLES W. HILLS, Jr.,
FRED E. PAESLER.